UNITED STATES PATENT OFFICE.

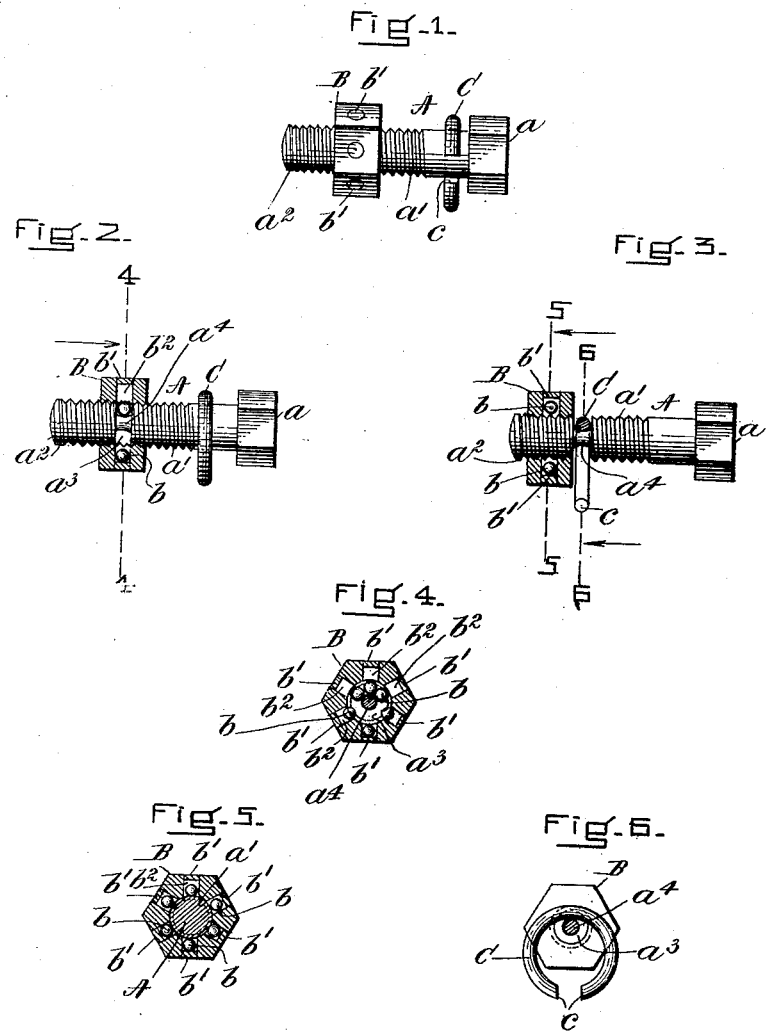

WILLIAM E. WATKINS, OF BOSTON, MASSACHUSETTS.

PUZZLE.

1,111,337.  Specification of Letters Patent.  Patented Sept. 22, 1914.

Application filed July 27, 1914. Serial No. 853,408.

*To all whom it may concern:*

Be it known that I, WILLIAM E. WATKINS, of Boston, in the county of Suffolk and State of Massachusetts, a citizen of the United States, have invented a new and useful Improvement in Puzzles, of which the following is a specification.

My invention in its details may be varied somewhat, but in its preferred form it comprises an ordinary bolt or threaded rod having a circumferential groove and a nut provided with means which normally engage said groove so that said nut cannot be moved in either direction and yet which when acted upon by centrifugal force will fly out from said groove and unlock said nut. This, which may preferably be coupled with a releasable member free to move upon the bolt but removable only when the groove is uncovered, comprises my invention.

My invention in its preferred form will be understood by reference to the drawings, in which—

Figure 1 is a side elevation. Fig. 2 is a side elevation of the bolt, the nut being in section and in locked position. Fig. 3 is a similar view, the nut being in unlocked position, and the releasable member in position to be removed from the bolt. Fig. 4 is a section on line 4—4 of Fig. 2, and Figs. 5 and 6 are respectively sections on lines 5—5 and 5—6 of Fig. 3.

A is the bolt having the usual head $a$. It is provided with threads $a^1$ which begin the usual distance from the head. At the other end of the bolt the threads are flattened as at $a^2$ after the nut is screwed onto the bolt so as to prevent its removal.

The bolt is turned down near the middle of its threaded portion as at $a^3$ to provide a circumferential groove which serves as one member of the lock by which the nut is locked and also provides a neck $a^4$ which enables the removal of the removable member.

B is the nut which is threaded on its interior to turn on the bolt in the ordinary manner. As shown it is hexagonal in shape and each of its six faces is bored from the exterior to the interior. In each passage so formed is placed a ball or shot $b$ and the outer end of each passage is closed by a plug $b^1$, thus leaving a chamber $b^2$ sufficiently large to continue the entire shot (see Fig. 5). The depth of the groove $a^3$ should be such that when the shot lie in the groove their upper surfaces will engage the nut and prevent it from being turned in either direction far enough to uncover the groove.

It will be seen from Fig. 4 that the upper balls rest on the neck $a^4$ and lock the nut. If the nut is oscillated rapidly these upper balls will fly outwardly into their chambers $b^2$ and thus be clear of the walls of the groove $a^3$ so that by continuing the turning of the nut while the upper balls are in their chambers the nut may be caused to travel along the bolt in either direction as the case may be. By "upper balls" I mean those which are resting in the groove for the time being. Gravity will hold the other balls in their chambers.

In addition I provide a releasable member C which as shown is circular, its ends $c$, however, being separated sufficiently to slip over the neck $a^4$ which is formed by the groove $a^3$. The member C may, however, be otherwise shaped if desired. To release the member C from its positions shown in Figs. 1 and 2 the nut is oscillated with sufficient rapidity to throw out the balls $b$ from the groove $a^3$ into the chambers $b^2$ as above described.

I have described the parts $b$ as shot or balls, but it will be understood that while the locking member is preferably spherical in shape this may be other shapes if desired. I have shown my releasable member as a wire, but it may be a segmental washer or other shaped piece having a space which may pass the neck $a^4$ and of course it must be incapable of passing over the head of the bolt or over the nut. It need not necessarily be round.

The shape of the chambers in the nut may be altered or a single annular chamber may be substituted for them without departing from my invention.

What I claim as my invention is:—

1. The puzzle above described comprising a threaded bolt provided with a circumferential groove, a nut having a limited movement along said bolt, and means movable radially within said nut adapted normally to lie in said groove.

2. The puzzle above described comprising a threaded bolt provided with a circumferential groove forming a neck and a nut provided with chambers, locking members located in said chambers and adapted to move radially therein into said groove to lock said nut and to be thrown outwardly therefrom upon the rapid rotation of said nut to unlock said nut.

3. The puzzle above described comprising a threaded bolt provided with a circumferential groove, a nut having a limited movement along said bolt, and means movable radially within said nut adapted normally to lie in said groove, in combination with a releasable member adapted normally to slide on said bolt and be released when registering with said groove.

WILLIAM E. WATKINS.

Witnesses:
 GEORGE O. G. CONER,
 M. E. FLAHERTY.

Copies of this patent may be obtained for five cents each, by addressing the "Commissioner of Patents, Washington, D. C."